(No Model.)
O. B. GALLUP.
MANUFACTURE OF COMBS, &c.
No. 308,889.   Patented Dec. 9, 1884.
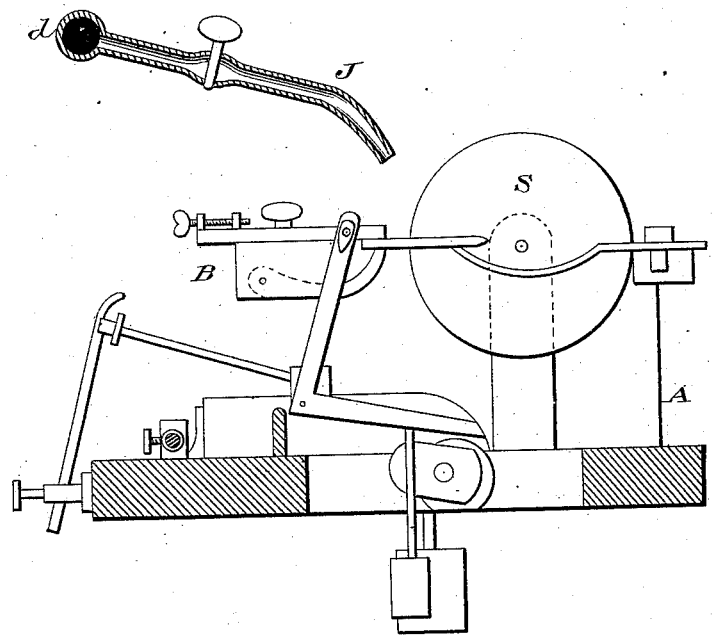
Witnesses:
H. S. Hoyt
J. Hindon Hyde
Inventor.
Orrin B. Gallup
by
C. Wyllys Betts
Attorney.

UNITED STATES PATENT OFFICE.

ORRIN B. GALLUP, OF NEW YORK, N. Y., ASSIGNOR TO THE CELLULOID MANUFACTURING COMPANY, OF NEWARK, NEW JERSEY.

MANUFACTURE OF COMBS, &c.

SPECIFICATION forming part of Letters Patent No. 308,889, dated December 9, 1884.

Application filed March 31, 1883. (No model.)

*To all whom it may concern:*

Be it known that I, ORRIN B. GALLUP, of the city of New York, in the county of New York and State of New York, have invented a new and useful Improvement in the Manufacture of Combs and other Articles from Celluloid and Analogous Material, of which the following is a specification, reference being had to the accompanying drawing.

My invention relates to the manufacture of combs and other articles from celluloid and analogous material.

It consists in a process wherein a blast of cold air is thrown on the saw or near it upon the blank of celluloid or analogous material, or upon both the saw and the blank, during the operation of the saw.

In the manufacture of combs and other articles from celluloid and analogous materials which are cut by saws, the material is fastened upon a running-gear, by which it approaches and recedes from the saw. It has been found that with any ordinarily-constructed saw, after cutting into the material for a short time, a peculiar result becomes apparent, the reason for which is not fully understood, but which is apparently, to a greater or less extent, dependent upon the presence of heat. The teeth of the comb bend and become irregular, and their edges are rough and covered by an adherent "beard," which requires some effort to remove. To obviate this difficulty, I am aware that a stream or jet of water has been thrown upon the celluloid and analogous material in the manufacture of combs, as shown in the patent of William Booth, No. 223,311; but this has been expensive, first, on account of the great waste of sawdust of the material sawed, which is ruined and rendered wholly or partly useless by water, and, second, on account of the amount of water necessary to carry on the manufacture.

By the application of tests I have made the simple yet unexpected and singular discovery that the nature of pyroxyline material—such as celluloid—is such and its behavior while being cut and its susceptibility to heat and cold are such when cut into the small slivers used as comb-teeth that much of the difficulty encountered will be obviated by the use of a blast of cold air. The sawdust, which is worth about forty cents a pound, will be saved, and it will cost less to operate the machinery in consequence of saving the water, and the process will be much cleaner, while at the same time it will prevent the heating of the saw, the melting and gumming of the material, and thus enable celluloid and analogous materials to be sawed with greater economy and cleanliness than by the use of water. If any water is required to act on the comb-blank, a very small amount will be all that is necessary to give the required smoothness to the cut, and such amount will not be sufficient to impair the sawdust.

The description of the working of my machine is as follows: By preference I use a circular saw, although a saw of any desired construction may be used, and it may be mounted in any suitable way. Near this saw a small pipe or jet is placed so arranged that a blast of cold air will be continually thrown out from it at or near to the point where the saw touches the celluloid or analogous material.

In the accompanying drawing is shown a device which I have operated.

A denotes the frame of the machine; B, the device carrying the blank of the material C.

S denotes the circular saw. Directly above the saw is the jet, made like a gas-jet, attached to the end of the small pipe J, which extends downward from the cold-air pipe *d* and covers the point where the saw meets the material.

The cold-air tube can be made of any length desired, and from it can extend down toward the saw as many smaller pipes with jets as there are machines operating.

It is of importance that the main cold-air tube, from which the smaller tubes extend downward, should be kept constantly filled with cold air. This is done by a fanning or other machine for causing pressure connected with the cold-air tube, or by any other suitable means. The position of the jets should be such that the cold stream of air will always be at or very near the point where the saw touches the material.

What I claim as my invention is—

The process of sawing or otherwise cutting celluloid or other analogous material, consisting in the application during the process of sawing or cutting of a stream or jet of air directed upon the saw or cutter at or near the point where the sawing or cutting operation takes place, substantially as and for the purpose specified.

ORRIN B. GALLUP.

Witnesses:
IRVING W. SPENCER,
H. S. HOYT, Jr.